United States Patent
Di Lauretis et al.

(10) Patent No.: US 6,874,300 B2
(45) Date of Patent: Apr. 5, 2005

(54) METHOD AND APPARATUS FOR THERMOFORMING FILMS

(75) Inventors: Giacomo Di Lauretis, Teramo (IT); Mario Rosario Di Donna, Sambuceto di San Giovanni Teatino (IT)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/607,684

(22) Filed: Jun. 27, 2003

(65) Prior Publication Data

US 2004/0000128 A1 Jan. 1, 2004

(30) Foreign Application Priority Data

Jun. 28, 2002 (EP) .............................................. 02254559

(51) Int. Cl.[7] .............................................. B65B 47/00
(52) U.S. Cl. .............................. 53/453; 53/452; 53/454; 53/560; 53/511; 53/173; 53/561; 53/389.1
(58) Field of Search .......................... 53/453, 452, 454, 53/560, 561, 511, 173, 389.1–389.5; 198/689.1, 804–853

(56) References Cited

U.S. PATENT DOCUMENTS

| | | | | |
|---|---|---|---|---|
| 3,664,088 A | * | 5/1972 | Sherman ...................... 53/547 |
| 3,762,252 A | * | 10/1973 | Hujer et al. ................. 271/198 |
| 3,791,507 A | * | 2/1974 | Kaeding et al. ............. 198/449 |
| 3,827,545 A | * | 8/1974 | Buhayar ................... 198/461.2 |
| 4,110,957 A | * | 9/1978 | Lancaster et al. ............. 53/589 |
| 4,233,801 A | * | 11/1980 | Watt ............................ 53/453 |
| 4,301,911 A | * | 11/1981 | Albo .......................... 198/412 |
| 4,947,621 A | * | 8/1990 | Christine et al. .............. 53/451 |
| 5,648,140 A | * | 7/1997 | Vaders ........................ 428/131 |
| 5,666,783 A | * | 9/1997 | Focke et al. .................. 53/228 |
| 5,699,707 A | * | 12/1997 | Campbell, Jr. ................ 83/100 |
| 5,783,273 A | * | 7/1998 | Yamamoto et al. ......... 428/35.9 |
| 6,000,528 A | * | 12/1999 | van Maanen ............. 198/461.1 |
| 6,023,911 A | * | 2/2000 | Elvers et al. ............... 53/389.5 |
| 6,675,560 B2 | * | 1/2004 | Gott et al. .................... 53/461 |
| 6,711,880 B2 | * | 3/2004 | Wipf et al. .................... 53/450 |
| 2004/0000128 A1 | * | 1/2004 | Di Lauretis et al. |
| 2004/0093831 A1 | * | 5/2004 | Busch et al. |

* cited by examiner

*Primary Examiner*—Scott A. Smith
*Assistant Examiner*—Brian Nash
(74) *Attorney, Agent, or Firm*—Armina E. Matthews; Brahm J. Corstanje; Kim William Zerby

(57) ABSTRACT

Pouches which can then be filled and sealed are made by thermoforming a film (29) into moulds (23) in a conveyor (8, 10, 11, 21) while holding the side edges (45) of the film to the side margins (46) of the conveyor by under-pressure applied to the underside of the film through a plurality of holding orifices (44) which extend up through the conveyor and into each side margin (46).

12 Claims, 1 Drawing Sheet

METHOD AND APPARATUS FOR THERMOFORMING FILMS

This invention relates to a method and apparatus for thermoforming a film and, in particular, to such method and apparatus wherein the film is thermoformed into pouches which are then filled and sealed in a sequential operation.

BACKGROUND OF THE INVENTION

Methods of this general type are well known. An early disclosure is in U.S. Pat. No. 3,218,776. In that method the film is thermoformed into pouches and filled while travelling in a circular path, but flat bed systems are also known. The methods involve laying a thermoformable film on to a conveyor which has an upper surface which includes longitudinal side margins and a plurality of moulds between the side margins, holding the side edges of the film to the side margins to resist inward movement of the side edges, and thermoforming the film into the moulds to form pouches in the moulds, and then filling and sealing the pouches while on the conveyor.

Various mechanisms are known for holding the edges of the film to the side margins of the conveyor. Often the methods involve mechanical tenters or other clips by which the edges of film are mechanically secured to the upper surface of the side margins. Another method involves providing a groove along each side margin of the conveyor and pressing an elastic or other member into the groove so as to trap an edge of the film in the groove.

The known systems suffer from various problems. For instance the use of clips or tenters is liable to result in non-uniform holding forces along the edges, with consequentially increased risk of wrinkling in the moulds. Another disadvantage with mechanical clips is the difficulty of achieving rapid fastening and release, as is required for high speed manufacture of pouches. Another problem is that the clips have to be positioned for a particular film width and so any variations in film width necessitate modifying the apparatus.

All these methods also have the disadvantage that they require extra mechanical items to provide the necessary holding and this in turn necessitates careful registration and synchronisation with the high speed manufacturing process. Also they all suffer from the disadvantage that the holding system is liable to be contaminated by whatever is filled into the pouches with the result that, during long term running of a high speed process, serious contamination problems are likely to occur. This may reduce the effectiveness of the holding system or may even make it inoperable. This is a particular problem when the material which is being filled is a liquid or gel, for instance a liquid detergent.

Another method involves providing temporary adhesion between the film and the conveyor. For instance adhesion can be provided by wetting it with water when the film is water soluble. However this system has the disadvantage that if strong adhesion is provided the film may be permanently weakened, but if only weak adhesion is provided then the adhesion is insufficient to hold the edges against strong thermoforming forces.

The object behind the invention is to provide a system for holding the side edges of the film to the side margins of the conveyor to resist inward movement of the side edges during thermoforming, but which avoids some or all of the problems discussed above.

SUMMARY OF THE INVENTION

According to the invention, we make filled and sealed pouches using an apparatus comprising:

a. a conveyor support and a conveyor which travels over the support and which has an upper surface which includes a longitudinal side margin along each side and a plurality of moulds between the side margins, means for thermoforming a film into the moulds to form pouches, and means for filling and sealing the pouches, b. and the method comprises applying thermoformable film on to the upper surface of the conveyor, c. forming the pouches by thermoforming the film into the moulds while holding each side edge of the film to a side margin of the conveyor to resist inward movement of the side edges, and d. filling and sealing the pouches and then discharging the pouches from the conveyor, e. and in this method the holding of the side edges of the film to the side margins of the conveyor is by under-pressure applied to the underside of the film through a plurality of holding orifices which extend up through the conveyor into each side margin and which creates friction forces which are sufficiently large to resist inward movement of the side edges of the film during the thermoforming.

The invention also includes novel apparatus wherein the conveyor is provided with the holding orifices and means for providing the required friction forces.

Thermoforming of the film into the moulds will result in the film being subjected to forces directed inwardly from the edges towards the moulds. In the invention, friction forces between the side edges of the film and the side margins of the conveyor are created by the under-pressure applied through the holding orifices. These friction forces are sufficiently large to resist the inward forces created during the thermoforming process and so these friction forces hold each edge of the film to the side margin of the conveyor over which that edge is positioned and prevent unacceptable inward migration of the side edges.

Preferably the forces are such as to prevent any inward migration of the side edges but it is sufficient for the invention if small amounts of inward migration occur provided these amounts are such as to be acceptable and not to cause visible deformation or other failure of the sachets.

Additional holding means, for instance of known types, can be used in combination with the holding orifices, so that the friction forces due to the holding orifices reduce the reliance on the additional holding means. Preferably the friction forces created by the holding orifices are the only forces that are used to resist the migration of the side edges, and so there need be no additional holding means.

The necessary friction forces are created by appropriate selection of several factors and the required forces will be influenced by the physical properties of the film.

One relevant factor is the number and arrangement of the holding orifices. Another relevant factor is the size of the orifices and the spread of sizes if they are not all the same size. Another relevant factor is the spacing between adjacent orifices. Another relevant factor is the shape of the outlets from the orifices, i.e., the profile of each orifice where it merges with the upper surface of the conveyor on which the film is positioned. Another relevant factor is the coefficient of friction of the material around each outlet. Another factor is the amount of under-pressure which is applied through the holding orifices.

In the invention, best results are usually achieved by arranging the holding orifices along each side margin in a band over which they are transversely distributed. The band may be substantially coextensive with the side margin (i.e., the orifices may be distributed over substantially the whole width of the conveyor between the outer edge of the moulds and the outer edge of the conveyor) or may be narrower than the side margin. The band may be of a material which is set into the side margin of it may merely be a region in (and of the same material as) the side margin. When (as is preferred) the conveyor carries mould plates, the holding orifices preferably extend through the side margins of the mould plates, often throughout the area outboard of the moulds in the mould plates.

Preferably the band contains at least two rows of orifices extending along the conveyor, preferably wherein the rows are offset from one another. The rows may be offset from one another with the outer edge of the orifices in one row being laterally positioned outwardly of the inner edge of the orifices of the outer row adjacent to it.

The inner edge of the orifices is preferably at only a small spacing from the outermost edges of the moulds in the conveyor. The spacing is preferably below 20 mm and usually below 10 mm. Generally it is 1–5 mm, preferably 1–2 mm.

It is preferred that there should be two or more longitudinal rows of holding orifices in this band. In general, the holding forces are increased as the number of orifices increases, and thus it is generally desirable to have a large number of smaller orifices rather than a small number of larger orifices.

Generally each orifice has a diameter in the range 0.1 to 10 mm. Usually the diameter is above 1 mm or 2 mm and preferably it is not above about 4 or 5 mm.

Because it is desirable to have a large number of small orifices, the orifices are preferably close to each other so that each orifice is separated from each adjacent orifice (preferably in every direction) by a spacing which is not more than five times, and usually not more than three times, the diameter of the orifices (or, if the adjacent orifices have different diameters, the diameter of the smaller orifice). When the orifices may splay outwardly near the surface of the conveyor, the diameter of an orifice is considered to be the diameter of the channel leading up to the point where it splays outwardly.

In order to optimise the friction forces created between the film and the conveyor, there needs to be as much contact as is reasonably possible between the film and the surface of the conveyor in the region of the orifices. Accordingly there must be adequate surface area exposed to provide for friction forces, and so the orifices should not be too close together. Generally the spacing between adjacent orifices is at least equivalent to the diameter of the orifices, or the smaller of the orifices if they are of different diameters.

In order to maximise the friction forces, the coefficient of friction of material which defines the outlets from the orifices and/or of the material between the orifices, should preferably be relatively high, for instance above 0.1, preferably above 0.3 and most preferably above 0.5, but generally below 1. The coefficient of friction (Cf) is defined as:

a. $Fv \times Cf = Fh$ b. where Fh represents the horizontal force required to make the film start slipping when it is static on the flat surface of the conveyor and a vertical force Fv is applied to it. This force Fv is the force applied in the invention by the under-pressure through the orifices.

It is preferred that the material which defines the outlets from the orifices, and the material of the band in which the holding orifices are located (or of the conveyor surface), should be formed from a resiliently deformable material which is not too hard (this being particularly important if the orifices are not splayed outwardly with the preferred rounded configuration). Preferably the strips set in the surface of the conveyor and defining the bands in the edge portions (or the entire conveyor upper surface) are each formed of a suitable resiliently deformable material. Preferred materials are silicone rubber, and preferred materials have a hardness typically in the range 10 to 90 Shore hardness (category Shore A), most preferably 40 to 70.

The selection of the under-pressure which is applied to the orifices will influence Fv and therefore, Fh and the ability of the orifices to provide a holding force which prevents inward lateral movement of the side edges of the film.

In order to maximise the area for friction, and thus the friction forces, it is desirable that some or all of the orifices should have an outlet which splays outwardly where they merge with the upper surface of the conveyor. Preferably each orifice (or some of the orifices) has a curved profile where it splays outwardly with a radius of curvature which is in the range 1 to 5 mm.

Account should be taken of the deformability of the film and the shape and size of the outlets when selecting the appropriate under-pressure. Best results are achieved when the under-pressure is such as to cause the film to be deformed slightly down into the outlet of each orifice.

The moulds may be arranged as a single row in the conveyor surface, but usually the moulds are arranged in two or more rows or randomly across the width of the conveyor.

The conveyor carries the film with it over the conveyor support and travels towards and through a thermoforming station at which the film is formed into the shape of the moulds.

Thermoforming may be by any technique, for instance by use of dies to press the film into the moulds. The invention is of particular value when the thermoforming is by application of under-pressure through orifices which extend through the conveyor into the moulds. This is advantageous because the same vacuum supply can then be used for providing the under-pressure necessary for holding the side edges of the film to the side margins of the conveyor as is used to shape the film in the thermoforming station.

The resultant pouches are then carried by the conveyor through a filling station at which they are filled with the chosen filling and a sealing station at which they are sealed, usually with another polymeric film. Subsequently the filled and sealed pouches are discharged from the conveyor.

Preferred apparatus according to the invention for forming filled pouches comprises:

a. a vacuum supply apparatus, b. a conveyor support, c. a row of vacuum apertures leading from the vacuum supply apparatus and discharging through the conveyor support, d. a sequence of processing stations above the conveyor support and which comprise thermoforming, filling and sealing stations, e. a conveyor which includes a plurality of recessed vacuum moulds in its upper surface and mounted to slide over the conveyor support through each of the processing stations, f. vacuum moulding orifices extending through the conveyor into each of the vacuum moulds for transferring under-pressure from the vacuum apertures to each of the moulds, g. means for supplying thermoformable sheet material on to the conveyor ahead of the thermoforming station, h. drive means for driving the conveyor carrying the sheet material through the processing stations, i. means for supplying thermoforming under-pressure into the mould recesses at the thermoforming station through the vacuum apertures and the vacuum moulding orifices, j. vacuum holding orifices extending through the conveyor into the side margins of the conveyor for transferring under-pressure from the vacuum apertures to the side margins of the conveyor, whereby the side edges of the film can be held to the side margins of the conveyor by friction forces which are sufficiently large to resist inward movement of the side edges during thermoforming.

The conveyor should be such that the vacuum moulds slide over the conveyor support in a manner that is substantially vacuum tight, so as to prevent undesirable loss of vacuum from the vacuum apertures.

The travel of the conveyor may be stepwise but is usually continuous. It may be substantially cylindrical around a substantially horizontal axis, with the filling and sealing stations being at or near the uppermost part of the cylindrical travel. Preferably however the conveyor is an elongated flat bed conveyor with the various forming, filling and sealing stations generally being arranged along the upper flat bed of the conveyor.

There may be a cutting station after the sealing station for cutting the sheet of pouches into individual pouches, or into groups of individual pouches, whilst still on the conveyor.

The apparatus may include means for heating the film in, or more usually as it approaches, the thermoforming station.

The under-pressure necessary to resist substantially inward movement of the side edges of the film as the film passes through the various processing stations can vary according to the conditions which prevail in each processing station. The strongest inward forces are usually exerted at the thermoforming station, since the under-pressure at this station may be in the range, for instance, −300 mbar to −900 mbar whereas lower under-pressures may be appropriate at the other stations. Accordingly the under-pressure through the holding orifices adjacent to the thermoforming station must be sufficient to resist this and either the same under-pressure can be applied to the holding orifices as they pass through all the processing stations or lesser under-pressure can be applied at the other stations. An appropriate value for any particular combination of film and apparatus can easily be determined by routine experimentation.

It can be rather inefficient to design the vacuum apertures in such a way as to achieve the required high vacuum for the thermoforming station and lower vacuum elsewhere while using a single vacuum supply apparatus. Preferably, therefore, the vacuum apertures which lead to lower vacuum stations lead from a first vacuum apparatus and the vacuum apertures which lead to the thermoforming station lead from a second vacuum apparatus, wherein the first vacuum apparatus is a higher volume, lower under-pressure, apparatus for applying a lower under-pressure and the second apparatus is a lower volume, higher under-pressure, apparatus for applying the thermoforming under-pressure at the thermoforming station.

As an example the first vacuum apparatus can be a simple vacuum pump, or even a fan, or other apparatus designed, for instance, to remove most of the air fast from the holding station at a large air flow but under a low under-pressure, and the second vacuum apparatus can be a vacuum chamber constructed to give a high thermoforming under-pressure, but with only relatively small amounts of air being removed.

When there are two different types of vacuum supply apparatus, the vacuum orifices into the side margins of the conveyor can if desired all lead from the vacuum apertures which lead from the lower volume, higher under-pressure apparatus.

The conveyor preferably comprises a continuous belt and an assembly of vacuum moulds carried on the belt wherein the belt makes substantially vacuum-tight sliding contact with the conveyor support and the assembly of moulds is secured for movement with the belt, and wherein there are passages through the belt for transmitting under-pressure from the vacuum apertures to the moulds. Thus, as the belt moves over the conveyor support, it maintains a vacuum-tight seal between the support and the belt but carries the assembly of moulds in sequence from one processing station to the next and allows the selected under-pressure to be applied through the belt to the moulds and the side margins in each processing station. This arrangement allows for simple design and construction and, if required, for the provision of an appropriate under-pressure to the moulds at each station and to the holding orifices at each station.

The assembly of moulds preferably comprises a series of platens which are mounted on the belt, and mould plates which contain the vacuum moulds in their upper surface and which are mounted in the platens with the mould plates in vacuum contact through the platens and the continuous belt with the vacuum apertures in the conveyor support. Thus the belt not only slides over and seals with the conveyor support but also seals against adjacent platens and mould plates.

The apparatus may be constructed to operate with stepwise motion, whereby the pouches move into a station, are treated appropriately in that station while stationary, and then move to the next station. However the invention is of particular value when the apparatus includes means for driving the conveyor, and thus the mould plates and film, continuously through the processing stations and discharging the pouches continously.

The film which is to be thermoformed may be any suitable thermoformable film, for instance preferred films are made of polymeric materials. The film can for example be obtained by casting, blow-molding, extrusion or blow extrusion. The polymer preferably has a weight average molecular weight of from about 1000 to 1,000,000, or even from 10,000 to 300,000 or even from 15,000 to 200,000 or even from 20,000 to 150,000.

Preferred polymer copolymers or derivatives thereof are selected from polyvinyl alcohols, polyvinyl pyrrolidone, polyalkylene oxides, (modified) cellulose, (modified) cellulose-ethers or –esters or –amides, polycarboxylic acids and salts including polyacrylates, copolymers of maleic/acrylic acids, polyaminoacids or peptides, polyamides including polyacrylamide, polysaccharides including starch and gelatine, natural gums such as xanthum and carragum. Preferably, the polymer is selected from polyacrylates and acrylate copolymers, including polymethacrylates, methylcellulose, sodium carboxymethylcellulose, dextran, maltodextrin, ethylcellulose, hydroxyethyl cellulose, hydroxypropyl methylcellulose; most preferably polyvinyl alcohols, polyvinyl alcohol copolymers and/or hydroxypropyl methyl cellulose (HPMC).

Most preferred are materials which are water-soluble stretchable and elastic material comprising PVA polymer having properties such as for example, available from Nordenia, Aquafilm, Kuraray, Chris-Craft Industrial Products. Typically it has a thickness of from 10 to 100 ÿm.

The size of the pouches is typically from 5 to 200 mls, often having an upper surface area of 1 to 100 $cm^2$ and a depth of from 1 to 100 mm.

The filling for the pouches may be solid or liquid and may be a gel. Preferably the pouches are to dissolve when added to water, in which event the sealing film or the pouch film, and preferably both films, dissolve or disintegrate in water. The filling for the pouches may be, for instance, a laundry detergent, dishwashing composition, fabric softener composition, bleaching composition or beauty care composition.

The pouches are sealed by bonding another film across the top of the sheet of pouches while it is still supported on the conveyor, the bonding either being by adhesive, solubilisation of the surface of the pouch film or the sealing film or both, or by thermal adhesion or by a combination. Preferably the bonding is by a combination of solvent welding and thermal adhesion.

BRIEF DESCRIPTION OF THE DRAWINGS

The invention is illustrated in the accompanying drawings in which.

DETAILED DESCRIPTION OF THE DRAWINGS

Figure 1:
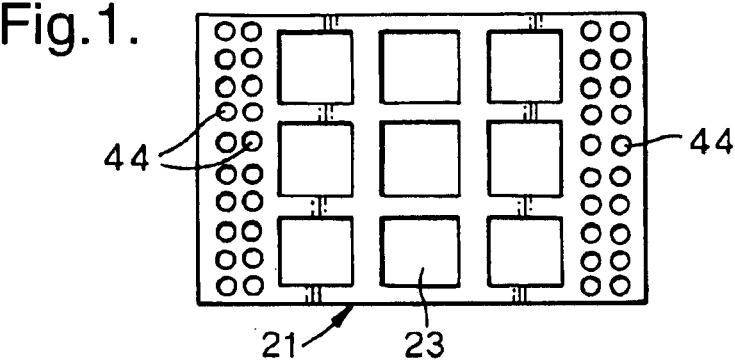
FIG. 1 is a plan view of a mould plate suitable for use in the invention.
Figure 2:
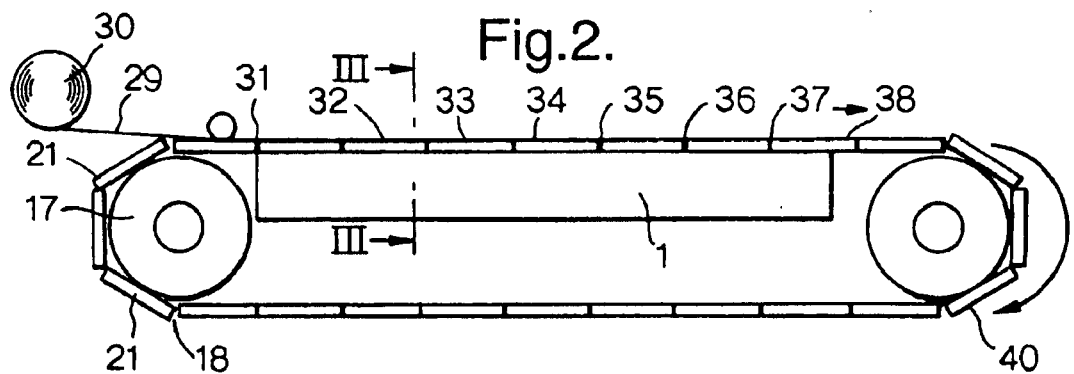
FIG. 2 is a diagrammatic side view showing the travel of the mould plates through a series of processing stations on a conveyor, the details of the conveyor and the conveyor support not being shown in FIG. 2.

A plurality of mould plates 21 shown in FIG. 1 are carried, as shown diagrammatically in FIG. 2, as the upper surface of a conveyor through a series of processing stations while film 29 is laid on to their upper surface and deformed into the moulds.

The film 29 carried on the mould plates 21 is carried initially to point 31, and from there is carried with the conveyor in sequence to points 32, 33, 34, 35, 36 and 37. These points indicate the start and finish of various processing stations, some of which may be equilibrating stations. For instance the film may equilibrate between points 31 and 32, be subjected to thermoforming in two stages between points 32 and 33 and points 33 and 34, the resultant pouches filled between points 35 and 36 and sealed between points 37 and 38. The pouches may then cut from one another and tipped out of the moulds as the conveyor travels down to the lower path of travel.

Figure 3:
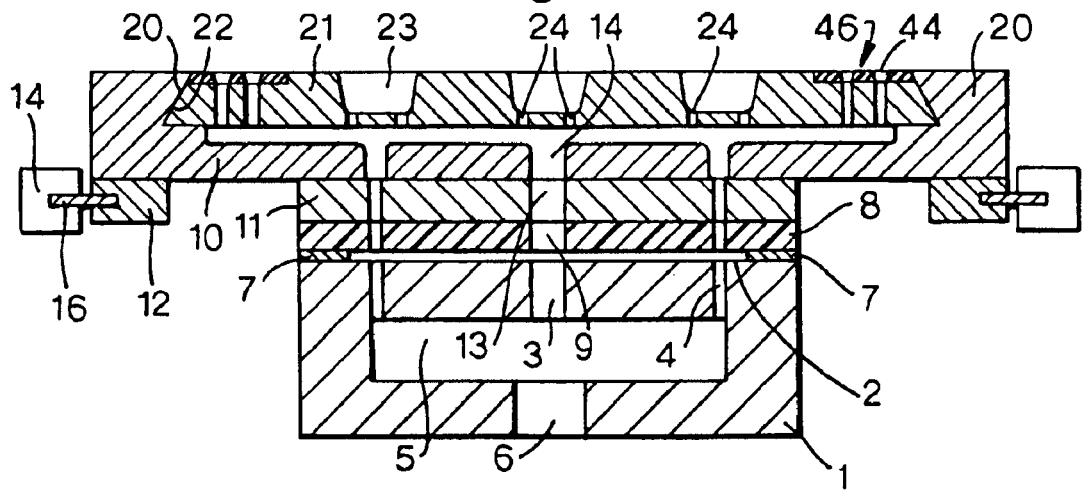
FIG. 3 is a cross section on the line III—III in FIG. 2.
Figure 4:
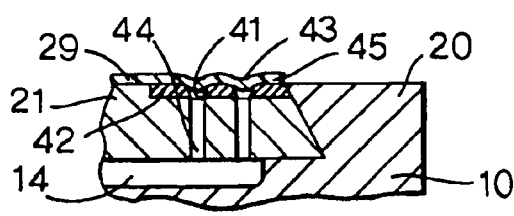
FIG. 4 is an enlarged view of a portion of the cross section of FIG. 3, when the film is in position over the mould plates.

The conveyor is formed of the mould plates 21 fitted within platens 10 mounted on a belt 11 and which is driven by a chain or other drive mechanism 14, as shown in FIG. 3. This conveyor slides over a conveyor support 1 which contains the supply of vacuum, as shown in FIG. 3. The under-pressure through vacuum orifices 44 in the side margins of the mould plates cause the film 29 to be deformed slightly down into the orifices, as shown in FIG. 4, and restrains inward movement of the side edges 45 of the film.

In more detail, the illustrated apparatus comprises a vacuum supply apparatus 1 which serves as part of the conveyor support and the top of which is defined by a conveyor support surface 2 through which a plurality of vacuum apertures 3 and 4 extend from a vacuum box 5 to which suction is applied by a pump (not shown) through a channel 6.

There are smooth low friction strips 7 extending along the sides of the support 2. These strips are made of polyurethane or other suitable low friction material. They are firmly secured to the surface 2.

A steel belt (or other smooth impermeable belt) 8 is part of the conveyor and slides over the strips 7 making a substantially vacuum-tight seal with them. The steel belt 8 has apertures 9 extending through it, and these may be arranged in the same pattern as the apertures 3 and 4 or in any other suitable pattern whereby vacuum can be applied from the apertures 3 and 4 through the belt 8.

Platen plates 10 each have a base 11 and side rails 12 fixed to it, the base 11 having apertures 13 corresponding to the apertures 9 in the steel plate 8.

Chains 14 are driven by a drive mechanism (not shown) and pins 16 transmit the drive between the chains 14 and the side rails 12. The steel belt 8 is driven by a drum 17 on the same drive mechanism as the drive for the chains. The drum 17 is therefore part of the conveyor support. The steel belt 8 and the chains 14 are inextensible, whereby the belt 8 and the platens 10 move with one another and have intermeshing faces which are sufficiently smooth that they are in substantially vacuum-tight inter-engagement. Thus, rotation of the drive mechanism for the chains and belt causes the belt 8 to move in a vacuum-tight manner over the support 2 and causes the platens 10 to move in a vacuum-tight manner with the belt 8. The individual platens are separated from one another as shown at 18 and are positioned on the belt 8 such that there is no aperture 13 extending through the belt at positions between the platens.

Each platen has an inwardly inclined side rail 20 on each side. A mould plate 21 having correspondingly shaped edges 22 is slidably fixed between these inwardly inclined side rails and has the same length (in the direction of the conveyor) as the platen in which it is mounted.

A vacuum chamber 14 is defined between the upper surface of the platen and the lower surface of the mould plate 21. There are mould recesses 23 in the upper surface of the mould plate and vacuum orifices 24 leading into the base of each of the mould recesses, to transmit vacuum from the vacuum chamber 14 which, in turn, is provided with an appropriate under-pressure by vacuum applied through the vacuum passages 13, 9, 3 and 4, 5 and 6.

A sheet of thermoformable material 29 is fed continuously from roll 30 down on to the upper surface of the mould plate 21 with its side edges 45 over the side portions 46 of the mould plate 21.

Holding orifices 44 extend upwardly through the mould plate 21 in its outer side margins 46 adjacent to the side rails 20 of the platen 10, and thus these orifices 40 are located in the side margins of the conveyor. There is a band 42 of silicone rubber set into, and extending along the length of, each mould plate 21 in these side margins. The orifices 44 extend upwards through the plate 21 and splay outwardly at their upper outlet. The application of under-pressure through the orifices 40 causes the film 29 to be sucked down into the orifices as shown at 43 in FIG. 4.

As a result, lateral movement of the edge 45 of the film is resisted by the suction of the film exerted through the orifices 44 and the resultant frictional engagement between the film and the splay openings and the flat surface of the silicone rubber inlay 42.

Typically the under-pressure applied through holding orifices 44 is the same as, or similar to, the under-pressure applied through the orifices 24 in the adjacent moulds 23. Thus when maximum under-pressure (and thus maximum lateral inward forces) are created in the moulds 23, maximum under-pressure is applied through the holding orifices 44 adjacent to those moulds.

What is claimed is:

1. A method of manufacturing filled and sealed pouches using an apparatus comprising a conveyor support (1, 2, 17) and a conveyor (8, 10, 11, 21) which travels over the support and which has an upper surface which comprises a longitudinal side margin (46) along each side and a plurality of moulds (23) between the side margins, means (1, 14 and 24) for thermoforming a film into the mould to form pouches and means for filling and sealing the pouches, wherein the method comprises applying thermoformable film (29) on to the upper surface of the conveyor (8, 10, 11, 21), forming the pouches by thermoforming the film (29) into the moulds (23) while holding each side edge (45) of the film (29) to a side margin (46) of the conveyor to resist inward movement of the side edges (45), and filling and sealing the pouches and then discharging the pouches from the conveyor, wherein the holding of the side edges (45) of the film to the side margins (46) of the conveyor is by under-pressure applied to the underside of the film (29) through a plurality of holding orifices (44) which extend up through the conveyor and into each side margin (46) wherein the outlet from each holding orifice (44) is surrounded by material having a coefficient of friction of at least 0.3 and wherein said holding orifices (44) create friction forces which are sufficiently large to resist inward movement of the side edges (45) of the film during the thermoforming.

2. A method according to claim 1 in which the holding orifices (44) are arranged along each edge portion in a band (42) over which they are transversely distributed.

3. A method according to claim 2 in which the holding orifices (44) are arranged in two or more longitudinal rows within each band.

4. A method according to claim 1 in which the separation between adjacent holding orifices (44) is from about one to about five times the diameter of the orifices (44).

5. A method according to claim 1 in which each holding orifice (44) has a diameter of from about 1 mm to about 5 mm.

6. A method according to claim 1 in which the material surrounding the holding orifice (44) has a Shore hardness (grade A) of from about 10 to 90.

7. A method according to claim 6 in which the material is formed of silicone rubber.

8. A method according to claim 1 in which the thermoforming is by under-pressure applied to the moulds (23).

9. Apparatus for manufacturing filled and sealed pouches comprising a conveyor support (1, 2, 17) and a conveyor (8, 10, 11, 21) which travels over the support and which has an upper surface which comprises a longitudinal side margin (46) along each side and a plurality of moulds (23) between the side margins, means (1, 14 and 24) for thermoforming a film into the moulds to form pouches, means for filling the pouches, and means for sealing the pouches and means for holding each side edge (45) of the film (29) to a side margin (46) of the conveyor to resist inward movement of the side edges (45), wherein the means for holding each side edge (45) of the film (29) to a side margin (46) of the conveyor comprises a plurality of holding orifices (44) which extend up through the conveyor and into each side margin (46), wherein the outlet from each holding orifice (44) is surrounded by a material having a coefficient of friction of at least 0.3, and means for applying under-pressure to the underside of the film through the holding orifices and thereby creating friction forces which are sufficiently large to resist inward movement of the side edges (45) of the film (29) during thermoforming of the film into the moulds.

10. Apparatus according to claim 9 including means for applying an under-pressure into the moulds and thereby thermoforming the film into the moulds.

11. Apparatus according to claim 10 comprising also a vacuum supply apparatus, a row of vacuum apertures leading from the vacuum supply apparatus and discharging through the conveyor support, vacuum moulding orifices extending through the conveyor into each of the vacuum moulds for transferring under-pressure from the vacuum apertures to each of the moulds and wherein the vacuum holding orifices extend through the conveyor into the side margins of the conveyor for transferring under-pressure from the vacuum apertures to the side margins of the conveyor and the conveyor comprises a belt (8) which slides over and seals against the conveyor support (2).

12. Apparatus according to claim 9 in which the conveyor is formed of mould plates (21) fitted within platens (10) mounted on a belt (11), wherein the moulds (23) are formed in the mould plates (21).

* * * * *